United States Patent [19]

Mochizuki et al.

[11] Patent Number: 4,857,812
[45] Date of Patent: Aug. 15, 1989

[54] ELECTRIC MOTOR SYSTEM FOR AUTOMOBILES

[75] Inventors: Wataru Mochizuki; Seiichi Ogino; Hirohiko Takano, all of Kiryu, Japan

[73] Assignee: Mitsuba Electric Mfg. Co., Ltd., Gunma, Japan

[21] Appl. No.: 69,970

[22] Filed: Jul. 6, 1987

[30] Foreign Application Priority Data

| Jul. 7, 1986 | [JP] | Japan | 61-159356 |
| Jul. 7, 1986 | [JP] | Japan | 61-159357 |
| Jul. 7, 1986 | [JP] | Japan | 61-159358 |
| Aug. 11, 1986 | [JP] | Japan | 61-188053 |

[51] Int. Cl.$^4$ .................................. H02K 7/116
[52] U.S. Cl. .................................. 318/15; 318/443; 318/466; 318/DIG. 2
[58] Field of Search ............... 318/138, 254, DIG. 2, 318/15, 443, 446; 15/250 C, 250.12, 250.13, 250.17; 363/146

[56] References Cited

U.S. PATENT DOCUMENTS

| 3,530,350 | 9/1970 | Gawron et al. | 318/138 X |
| 3,644,765 | 2/1972 | Janson | 318/254 A X |
| 3,678,366 | 7/1972 | Tharman | 363/146 |
| 4,286,186 | 8/1981 | Hagenlocher et al. | 310/254 X |
| 4,616,164 | 10/1986 | Kenny et al. | 318/15 X |

Primary Examiner—Bentsu Ro
Attorney, Agent, or Firm—Nixon & Vanderhye

[57] ABSTRACT

Disclosed is an electric motor system for automobiles having an electric motor and a control circuit for the motor, wherein the control circuit is attached to a part of a metallic housing of the motor system by means of a bonding agent and is embedded in resin material so as to maintain a favorable heat removal from the control circuit by virtue of a high heat conductivity and a heat radiation capability of the housing. Preferably, the housing accommodates a speed reduction unit which is connected to the output shaft of the motor and reduces its rotation speed. Favorable heat removal from the control circuit improves the reliability and the performance of the control circuit, and since the control circuit can be directly wired to the motor the number and the cross section of the electric wires which extend between various parts of the motor system can be reduced.

8 Claims, 6 Drawing Sheets

ELECTRIC MOTOR SYSTEM FOR AUTOMOBILES

TECHNICAL FIELD

The present invention relates to an electric motor system for automobiles and in particular to an electric motor system which is compact and is provided with an advantageous wiring arrangement.

BACKGROUND OF THE INVENTION

From the past, considerable efforts have been directed to the reduction of the size and the weight of automotive equipment using electric motors. This is particularly important because, in recent years, an increasing number of motor driven accessories have come to be used in each automobile to the end of improving the performance and the convenience of the automobile. Manual operations required for achieving the actions of various moving parts of the automobile equipment have been taken over by electric motors to a large extent. For instance, a typical high grade automobile is equipped with a motor driven side window system, a windshield wiper system, a motor-driven sun roof, a power seat adjustment system and so on.

As a result, each automobile is equipped with so many electric motors that there is now a shortage of space for accommodating the control devices for these motors. Typically, control devices for on-board electric motors are built as individual units and fitted into spaces defined behind instrument panels, under the seats and so on. And, each electric motor requires a manual control switch and a control device and they must be connected by electric wires in the form of a wire harness. Therefore, not only the arrangement of the control devices and the electric motors but also the arrangement of the electric wires connecting the manual switches, the control devices and the motors tend to place a severe burden in designing and manufacturing on-board motor systems. Also, the complication of the control devices and electric wires causes a great difficulty in servicing the motor-driven automotive equipment.

Thus, it is desired to simplify the arrangement of the motor-driven automotive equipment but the reliability of the operation of the equipment must be assured at the same time. This is particularly important because automotive equipment is placed under severe operating conditions because it is often exposed to extreme temperatures and severe vibrations.

BRIEF SUMMARY OF THE INVENTION

In view of such problems of the prior art, a primary object of the present invention is to provide a motor system which can reduce the number of electric wires leading to the motor system.

Another object of the present invention is to provide a motor system which can reduce the length of the electride wires conecting various parts of each motor system.

Yet another object of the present invention is to provide a motor system which is reliable and durable by being resistant to vibrations and extreme temperatures.

According to the present invention, these and other objects of the present invention will be accomplished by providing an electric motor system for automobiles having an electric motor and a control circuit for the motor, wherein: the control circuit is attached to a part of a metallic housing the motor system in a mutually heat conducting relationship. Preferably, the electric motor system comprises a speed reduction unit and the part of the housing to which the control circuit is attached is a detachable cover of a housing for the speed reduction unit and the circuit is embedded in resin material.

Thus, in this electric motor system, by fixedly attaching the circuit board of the control circuit for the motor to the metallic housing of the motor system and combining them integrally together, removal of heat from the circuit board is promoted and the reliability and the durability of the electric motor system can be improved.

In order to minimize the space requirement for accommodating the control circuit within the housing, the control circuit preferably consists of a circuit board mounted with printed circuit elements and chip circuit elements including a semi-conductor device.

According to a certain aspect of the present invention, the control circuit comprises a switch which is activated by a moving part of the speed reduction unit and the motor system is a windshield wiper system.

According to another aspect of the present invention, the control circuit is connected to a detector for detecting a motion of the motor and the motor system is a power window system.

According to yet another aspect of the present invention, the control circuit is connected to a manual switch for selecting a function of the contol circuit, by way of an electric wire for controlling the semi-conductor device and, additionally, is directly connected to an electric wire leading to the motor, and the motor and the control circuit are connected to a common power source line.

Thus, the number and the length of the wires connecting the motor, the control system and the manual control switch can be reduced.

BRIEF DESCRIPTION OF THE DRAWINGS

The present invention will now be shown and described in the following in terms of concrete embodiments thereof with reference to the appended drawings, in which.

DESCRIPTION OF THE PREFERRED EMBODIMENT

Figure 1:
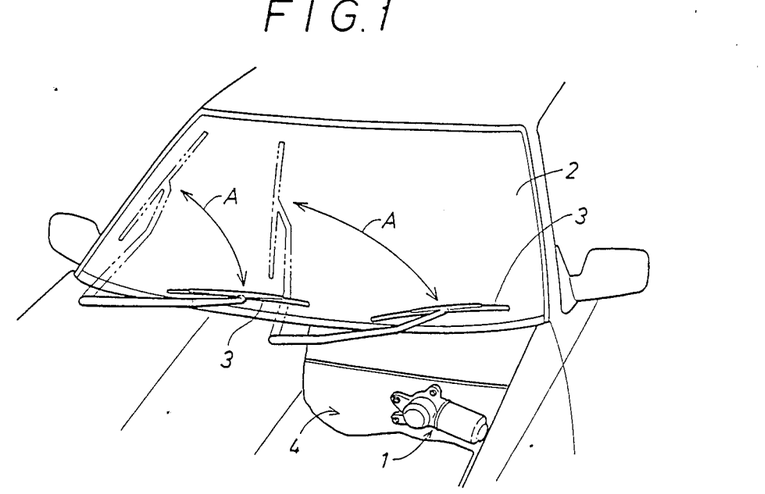
FIG. 1 is an overall view showing a windhshield wiper motor system according to the present invention.

FIG. 1 is a perspective view showing how a windshield wiper motor system 1 to which the present invention is applied is mounted. A pair of windshield wiper blades 3 are provided on the windshield 2 which is provided at the front part of the automobile for wiping off rain water from the surface of the windshield 2. The windshield wiper motor system 1 for driving the wiper blades 3 is fixed in an engine room 4 and by activating the windshield wiper motor system 1 the wiper blades 3 are caused to sweep back and forth across the windshield 2 in the direction indicated by the arrow A in the drawing by way of a crack arm and a link mechanism which are not shown in the drawings.

Figure 2:
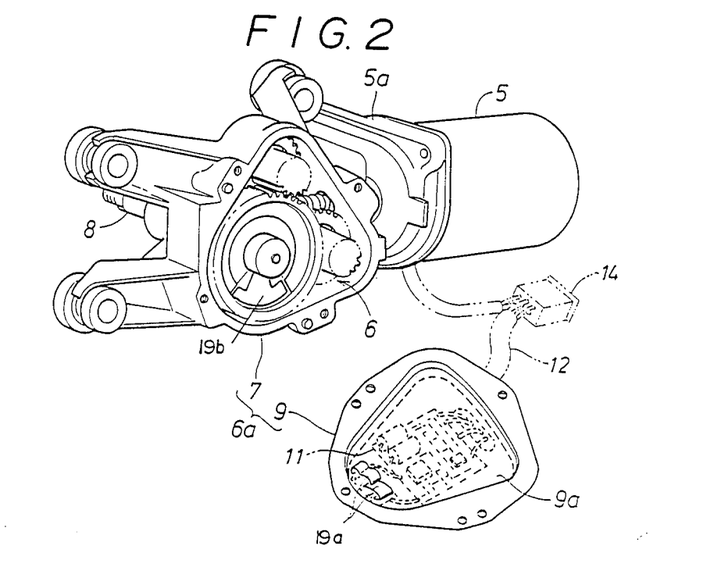
FIG. 2 is an exploded perspective view of the windshield wiper motor system of FIG. 1.

As illustrated in FIG. 2, the windshield wiper motor system 1 primarily consists of a DC motor 5 and a reduction gear device 6 having a plurality of gears therein, and a housing 7 for accomodating the reduction gear device 6 is integrally formed with the case 5a of the motor 5 as an extension thereof at the output shaft end of the motor 5. The crank arm which is not shown in the drawings is fixedly attached to the output shaft 8 of the reduction gear device 6 and the rotation of this crank arm causes the sweeping motion of the wiper blades 3 by way of the known link mechanism which is not shown in the drawings.

The housing 7 is made of cast aluminum alloy in the shape of a box accommodating the reduction gear device 6 and having legs for supporting the whole windshield wiper motor system 1, and a cover 9 made of press formed sheet metal is fixedly attached to the open end 7a of the housing 7 by means of screws so as to define the casing 6a of the reduction gear device 6 by the cooperation of the housing 7 and the cover 9. As shown in FIG. 2, the output shaft 8 projects from the casing 7 in the opposite direction from the open end 7a thereof.

The cover 9 is provided with a generally flat and depressed (or, in other words, outwardly bulging) middle part 9a as best shown in FIG. 2 and a circuit board 11 mounted with printed circuit components and chip components (such a circuit board is often called as a hybrid IC and is provided with printed conductive circuit patterns, resistors and capacitors and semiconductor chips as an integral package) and equipped with the functions of controlling the motor 5 as described hereinafter is fixedly attached to this flat portion 9a with a suitable bonding agent. This flat portion 9a is further covered by epoxy or other resin material for protecting the assembly from external influences such as grease and moisture. This resin material is also helpful in conducting heat from the circuit board 11 to the cover 9 and promoting the removal of heat from the circuit board 11. Cables 12 connected to the I/O terminals of the circuit board 11 extend out of the cover 9 to the outside and are connected to the motor 5 and a control switch 13 which is described hereinafter by way of a connector 14. Since the cover 9 is attached to the housing 7 by way of a gasket which is not shown in the drawings, the circuit board 11 is protected by this cover 9 from the instruction of moisture and dust from outside.

Figure 3:
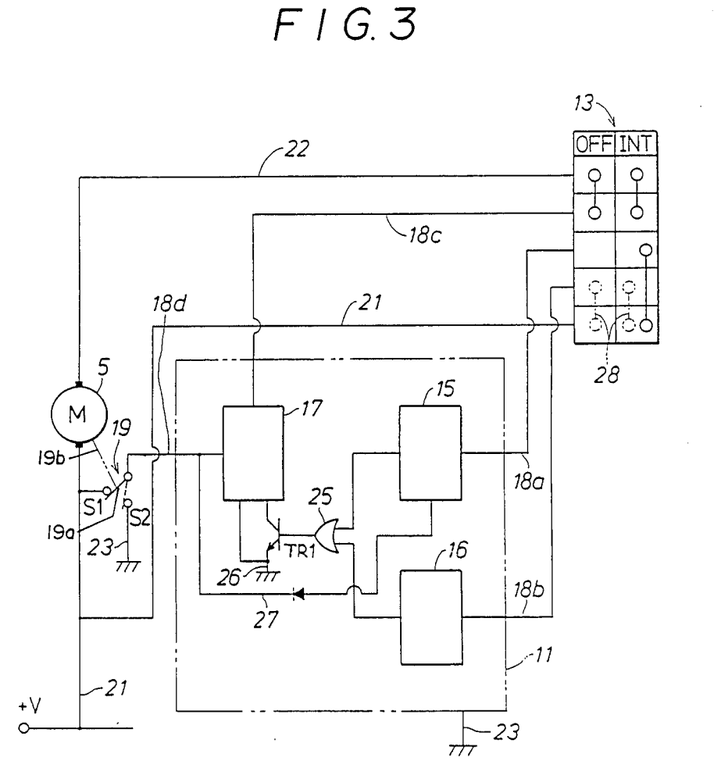
FIG. 3 is a simplified circuit diagram of a windshield wiper motor control circuit according to the present invention.

The hybrid IC or the circuit board 11 which is integrally attached to the cover 9 comprises an intermittent timer 15, a washer timer 16 and a motor drive circuit 17 which consist of known transistor circuits a shown in the simplified circuit diagram of FIG. 3.

To the circuit board 11 are connected signal lines which connect the circuits on the circuit board 11 to the control switch 13 and a park switch 19 which cooperates with the motor 5 so as to stop the motor 5 only when the wiper blade are at their park positions. A power line 21 is connected to the first terminal of the motor 5 and an interconnect line 22 leading to the control switch 13 is connected to the second terminal of the motor 5. A branch line of the power line 21 is connected to the control switch 13 and another branch line of the power line 21 is connected to one of the contacts S1 of the park switch 19. The park switch 19 includes contacts 19a attached to the cover 9 and electrically connected to the circuitry in the circuit board 11, and a sector shaped contact cam 19b mounted on a spur gear which is part of the speed reduction device. Ground lines 23 are connected to the other contact S2 of the park switch 19 and the circuit board 11. The outputs of the intermittent timer 15 and the washer timer 16 are supplied to the inputs of an OR circuit 25 and the output of the OR circuit 25 is conneced to a known transistor circuit which activates the motor drive circuit 17 by putting the transistor TR1 into a conductive state with the output of the OR circuit 25.

In the windshield wiper motor system 1 of the above described structure, when the intermittent mode (INT) is selected with the control switch 13, the power line 21 is connected to the signal line 18a and the intermittent timer 15 puts the transistor TR1 into the conductive state by way of the OR circuit 25. When the intermittent mode (INT) is selected by the control switch 13 and the interconnected line 21 of the second terminal of the motor 5 is connected to the signal line 18c, the transistor TR1 is in the conductive state and motor drive circuit 17 is in the active state. Therefore, the signal line 18c is electrically connected to a ground line 26 of the motor drive circuit 17, and the motor 5 starts turning. When the park switch 19 is switched over to the contact S2 as a result of the rotation of the motor 5 from its initial position, a signal line 27 connected to the reset terminal of the intermittent timer 15 is grounded and the intermittent timer 15 is reset. When the intermittent timer 15 is reset, the transistor TR1 is put into the non-conductive state and the motor drive circuit 17 is brought back to the initial state with the result that the signal line 18c is electrically connected to the signal line 18d which is grounded by the park switch 19, and the motor 5 continues to rotate.

When the wiper blades 3 have moved over one full wiping cycle back to their park positions and the park switch 19 is switched over to the contact S1 as a result, since the circuit of the motor 5 is closed by the interconnect line 22, the signal line 18c, the motor drive circuit 17, the signal line 18d and the park switch 19, the motor 5 quickly stops because of an electrodynamic braking action. When a certain time interval has elapsed after the intermittent timer 15 is reset, the intermittent timer 15 generates an output signal again and the above mentioned action is repeated.

When the washer mode 28 is selected as indicated by the imaginary line in FIG. 3 irrespective of which of the possible modes, the stop mode (OFF) and the intermittent mode (INT), is selected by the control switch 13, the power line 21 is electrically connected to the signal line 18b and the washer timer 16 puts the transistor TR1 into the conductive state by way of the OR circuit 25. At the same time, a washer motor which is not shown in the drawings is activated and washer fluid is sprayed onto the windshield. In the same manner as in the intermittent mode (INT), the motor 5 is rotated and the wiper blades 3 are activated until the time interval which is set up in the washer timer 16 has elapsed.

Although the above described embodiment involved the intermittent action and the washer-related action of the wiper blade, the windshield wiper motor control system of this embodiment may be provided with circuits for other actions such as low speed and high speed normal windshield wiper actions.

Figure 4:
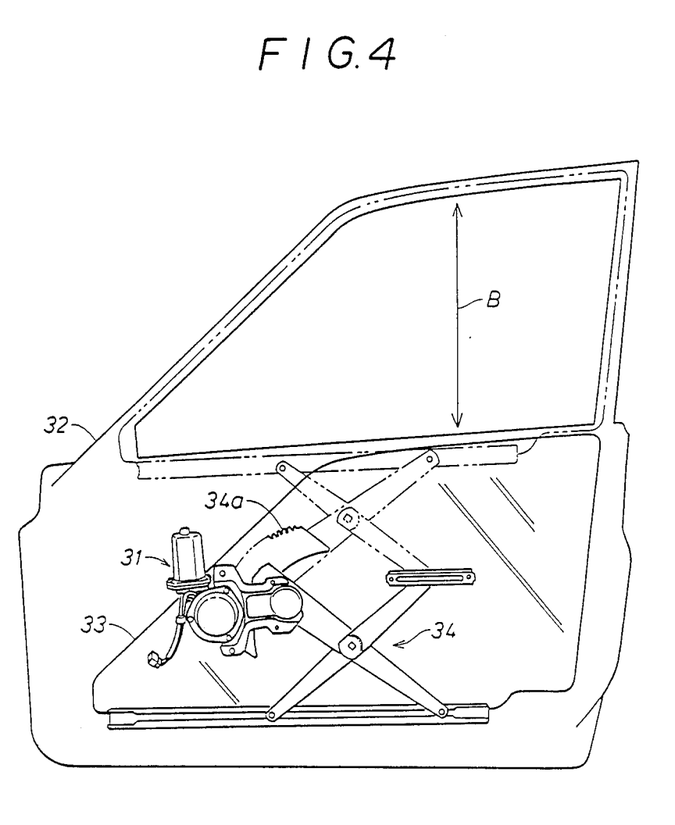
FIG. 4 is an overall view of a power window motor system according to the present invention.

FIG. 4 is schematic view showing a power window motor system 31 according to the present invention which is mounted within an automobile door 32. In the door 32 is provided a X-shaped link mechanism 34 for moving a side glass window 33 up and down. A pinion gear attached the output shaft (FIG. 5) of the power window motor system 31 meshes with a sector gear 34a formed in part of the X-shaped link mechanism 34 in such a manner that by activating the power window motor system 31 the sector gear 34a which is integrally provided in the X-shaped link mechanism 34 is driven in the direction to move the side glass window 33 vertically as indicated by the arrow B in the drawing by the resulting action of the X-shaped link mechanism 34.

Figure 5:
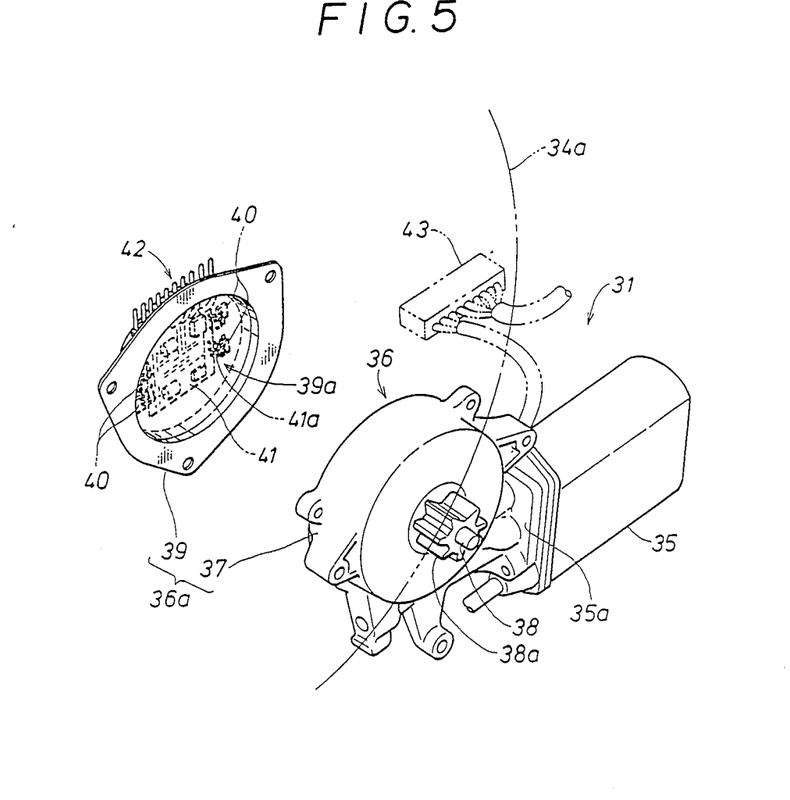
FIG. 5 is an exploded perspective view of the power window motor system of FIG. 5.

As shown in FIG. 5, the power window motor system 31 consists primarily of a DC motor 35 and a reduction gear device 36 which reduces the rotational speed of the DC motor 35 and produces a rotative power at its output shaft 38 having the pinion gear 38a fixedly attached thereto, and a housing 37 accommodating the reduction gear device 36 therein is integrally formed with a casing 35a of the motor 35 as an extension thereof at the output shaft end of the motor 35. The pinion gear 38a which is fixedly attached to the output shaft 38 of the reduction gear device 36 meshes with the sector gear 34a as mentioned earlier.

The housing 37 is made of cast aluminum in the shape of a cup for accommodating the reduction gear device 36 therein and is provided with legs for supporting the whole power window motor system 36, and the open end of the housing 37 defined opposite from the output shaft 38 is closed by a cover 39 which is made of press formed sheet metal and is attached to the housing 37 by means of screws, thus defining a case 36a for the reduction gear device 36 by the cooperation of the housing 37 and the cover 39.

The cover 39 is provided with a generally flat and depressed (outwardly bulging) middle part and a circuit board 41 which may consists of a hybrid IC and power devices such as power transistors 40 are fixedly attached to this flat portion 39a with a suitable bonding agent. This flat portion 39a is further covered by epoxy or other resin material for protecting the assembly from grease, moisture and so on. The power transistors 40 and the circuit board 41 are mutually connected by bonding wires 41a. The resin material is also useful in protecting the circuit board from vibrations and in removing heat from the circuit board 41.

The circuit board 41 is connected to the motor 35 and a control switch 44 which is described hereinafter by way of an I/O terminal 42 provided through the cover 39 and a connector 43 connected to the I/O terminal 42. Since the cover 39 is attached to the housing 37 by way of a gasket which is not shown in the drawings, the circuit board 41 is protected from the intrusion of moisture and dust from outside.

Figure 6:
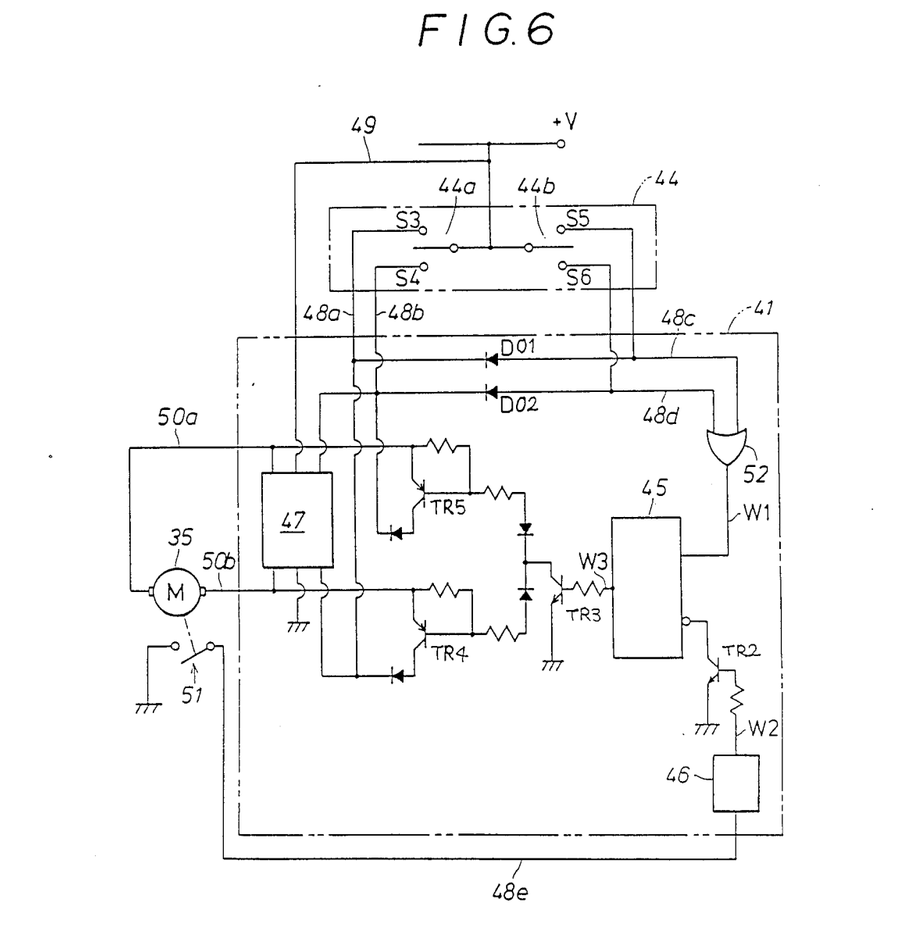
FIG. 6 is a simplified circuit diagram of a power window motor control circuit.

Further, the circuitry formed in the circuit board 11 comprises a flip flop circuit 45 and a rotation detection unit 46 which consist of known transistor circuits and a motor drive circuit 47 formed by a bridge circuit of the power transistors 40 as schematically illustrated in FIG. 6.

To the circuit board 41 are connected signal lines 48a to 48d extending from the control switch 44, a power line 49, interconnect lines 50a and 50b extending from the motor 35, and a signal line 48e extending from a pulse generator 51 which cooperates with the motor 35. The control switch 44 consists of a manual switch 44a and an auto switch 44b having the power line 49 connected to their common contacts, and the switches 44a and 44b are additionally provided with contacts S3 to S6 for moving the side glass window upward and downward, respectively. The manual switch 44a activates the motor 35 while the manual switch 44a is being acted upon. On the other hand, the auto switch 44b causes the side glass window to be lifted up or lowered all the way even when the auto switch 44b is turned on for a short time.

The signal lines 48c and 48d which are connected to the contacts S5 and S6 of the auto switch 44b are connected to the inputs of an OR circuit 42 and the output line W1 of the OR circuit 42 is connected to one of the inputs of the flip-flop circuit 45. The other input of the flip-flop circuit 45 is connected, by way of a transistor TR2, to the output signal line W2 had out from the rotation detection circuit 46 which is connected to the pulse generator 51 by way of the signal line 48e. The output signal line W3 of the flip-flop circuit 45 is connected to the transistors TR4 nd TR5 for normal and reverse rotation of the motor 35 by way of a transistor TR3. The circuitry connected to the transistors for normal and reverse rotation of the motor 35 consists of a known transistor circuit which can retain an ON state by means of a pulse signal from the transistor TR3.

The signal lines 48c and 48d connected to the contacts S5 and S6 of the auto switch 44b are also connected, by way of diodes D01 and D02, to the signal lines 48a and 48b which are connected to the contacts S3 and S4 of the manual switch 44a and the motor drive circuit 47. The motor drive circuit 47 consists of a bridge connection of the power transistors 40 as mentioned earlier so that the motor drive circuit 47 can continue to drive the motor 35 as long as the signal from the signal lines 48a and 48b persists or the transistors TR4 and TR5 remain in the ON state.

In this circuit for the power window motor system 31, when the contact S5 of the auto switch 44b of the control switch 44 is selected to be ON, the power line 49 is electrically connected to the signal line 48c and a voltage is applied to the motor drive circuit 47 by way of the diode D01 with the result that the motor drive circuit 47 drives the motor 35 in the direction to lift the side glass window 33. Further, since the voltage supplied to the motor 35 is also applied to the emitter of the transistor TR4 on the one hand and the flip-flop circuit 45 is set by way of the OR circuit 52 when the contact S5 of the auto switch 44b for lifting the side glass window is selected to be ON and the output of the flip-flop circuit 45 puts the transistor TR3 into the conductive state causing a flow of the base current to the transistor TR4 on the other hand, the transistor TR4 continues to be in the ON state or, in other words, the motor 35 continues to rotate even when the auto switch 44b is turned off.

When either the side glass window 33 has risen to its upper limit and it is detected by the rotation detection circuit 46 or the contact S4 of the manual switch 44a for lowering the side glass window is selected to be ON, the rotation of the motor 35 ceases. And, since the flip-flop circuit 45 is reset by the reset output from the rotation detection circuit 46 by way of the transistor TR2, the transistor TR4 is turned off by way of the transistor TR3 and the motor drive circuit 47 is reset with the result that the supply of electric current to the motor 35 stops.

Also, when the contact S6 of the auto switch 44b for lowering the side glass window is selected to be ON, the transistor TR5 turns on and the motor 35 turns in the reverse direction to lower the side glass window 33. When either the side glass window 33 has been lowered to its lower limit and it is detected by the rotation detection circuit 46 or the contact S3 of the manual switch 44a for lifting the side glass window 33 is selected to be ON, the transistor TR5 turns off in the same way as described above and the supply of electric current to the motor 35 stops.

The electric current is supplied to the motor 35 by way of the power transistors 40 and the temperature of the power transistors 40 tends to rise for instance when the side glass window 33 is brought to its upper or lower limit with the manual switch 44a and a large current is conducted through the power transistors 40. Therefore, the power transistors 40 are required to be equipped with heat radiation plates for removal of heat therefrom and, in this particular embodiment, the power transistors 40 are fixedly attached to the cover 39 of the reduction gear device 36 and the cover 39 maximizes the performance of the power transistors 40 by removing heat therefrom and cooling them.

Thus, by integrally attaching a circuit board which may be a hybrid IC having the control circuit for the motor system to part of the casing of the motor system, not only the length of the wires extending between the motor and the control device is reduced but also the number of wires extending between the control device and the control switch is reduced with the result that the vehicle weight is reduced and the assembly work is simplified. Furthermore, since there is not need for mounting a separate control device to the vehicle, the assembly work for the control device can be omitted and the circuit board can be incorporated into the casing of the motor system without any substantial modification of the casing for the motor system.

Figure 7:
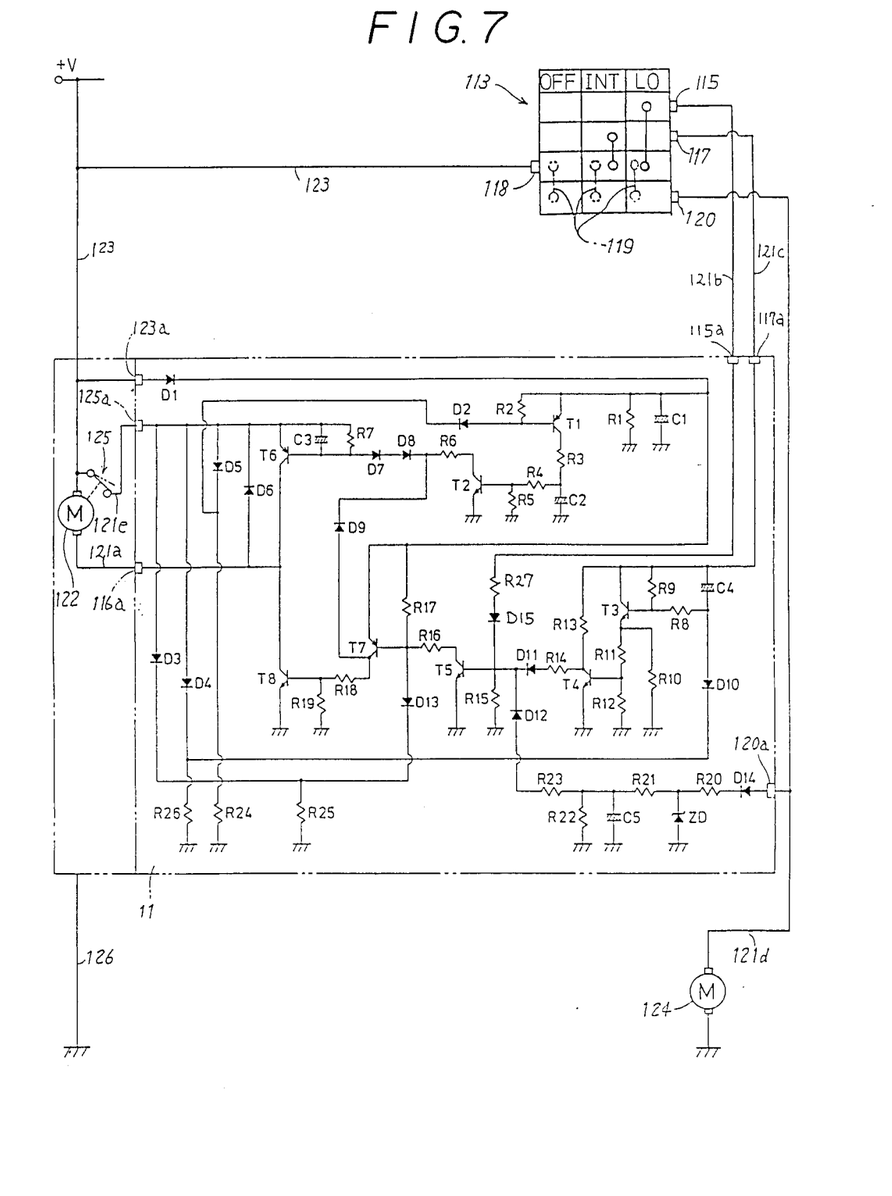
FIG. 7 is a simplified circuit diagram of another example of windshield wiper motor control circuit according to the present invention.

FIG. 7 shows a circuit diagram of a second embodiment of the control circuit for the windshield wiper motor system according to the present invention.

A control switch 113 is provided with a terminal 118 which is connected to a power line 123, a terminal 115 which is connected to the terminal 118 when the continuous mode (LO) is selected by the control switch 113, a terminal 117 which is connected to the terminal 118 when the intermittent mode (INT) is selected by the control switch 113, and a terminal 120 which is connected to the terminal 118 when the window washer mode is selected by the control switch 113. When the stop mode (OFF) is selected by the control switch 113, the terminal 118 or the power line 123 is connected to none of the terminals of the control switch 113.

The power line 123 is connected to an end of the windshield wiper motor 122 while the other end of the motor 122 is connected to a terminal 116a of the circuit board 11 by way of an interconnect line 121a. The terminals 115 and 117 of the control switch 113 are connected to terminals 115a and 117a of the circuit board 11 consisting of a hybrid IC by way of interconnect lines 121b and 121c. The power line 123 is further connected to a terminal 123a of the circuit board 11. The terminal 120 of the control switch 113 is connected to an end of a washer pump motor 124 by way of a interconnect line 121d and a line branched off from the interconnect line 121d is connected to a terminal 120a of the circuit board 11. The other end of the washer pump motor 124 is grounded.

One of the contacts of a position detection switch 125 which is similar to the park switch 25 shown in FIG. 3 and is synchronized with the rotational motion of the windshield wiper motor 122 is connected to the power line 123 and the other contact is a connected to a terminal 125a of the circuit board 11 by way of an interconnect line 121e. The circuit board 11 is grounded to the cover 9 which is a part of the casing of the windshield wiper motor system 1 by way of a ground line 126.

Thus, the circuit board 11 which is connected to the control switch 113, the windshield wiper motor 122 and the washer pump motor 124 by way of cables 12 including the power line 123 and the signal lines 121a to 121e carries control circuits consisting of transistor circuits for intermittent action of the windshield wiper and the action of the windshield washer in the form of a hybrid IC. Now, the details of these circuits are described in the following.

The terminal 123a connected to the power line 123 is grounded, by way of a diode D1, by a capacitor C1 and a resistor R1 which are connected in parallel to each other and is also connected to the emitter of the transistor T1.

The emitter of the transistor T1 is connected to the base of the transistor T1 by way of a resistor R2. The collector of the transistor T1 is grounded by way of a resistor R3 and a capacitor C2 and is also connected to the base of a transistor T2 with a grounded emitter by way of a resistor R4. The base of the transistor T2 is grounded by way of a resistor R5. And, the base of the transistor T1 is grounded by way of a diode D2 and a resistor R24.

The terminal 125a, which is connected to one of the contacts of the position detection switch 125 by way of the interconnect line 121e as mentioned earlier, is grounded by way of a diode D3 and a resistor R25 on the one hand and by way of a diode D4 and a resistor R26 on the other hand. Since the terminal 125a is additionally connected, by way of a diode D5, to the node between the diode D2 and the resistor R24, is also grounded by way of the diode D5 and the resistor R24. The terminal 125a is further connected to the emitter of a transistor T6.

The emitter of the transistor T6 is connected to the base of a transistor T6 by way of a capacitor C3 and a resistor R7 which are connected in parallel to each other. The base of the transistor T6 is connected to the collector of the transistor T2 by way of diodes D7 and D8 and a resistor R6. The collector of the transistor T6 is conected to the emitter of the transistor T6 by way of a diode D6.

The terminal 116a, which is connected to the second terminal of the windshield wiper motor 122 by way of the interconnect line 121b, the control switch 113 and the interconnect line 121a, is connected to the collector of the transistor T6, and to the collector of a transistor T8 with a grounded emitter.

The terminal 123a is also connected to the emitter of the transistor T7 by way of the diode D1. The emitter of the transistor T7 is connected to the base of the transistor T7 by way of a resistor R17. The collector of the transistor T7 is connected, by way of a diode D9, to the node between the diode D8 and the resistor R6 and to the base of the transistor T8 by way of a resistor R18. The base of the transistor T8 is grounded by way of a resistor R19. Since the base of the transistor T7 is connected to the node between the the diode D3 and the resistor R25 by way of a diode D13, it is grounded by way of the diode D13 and the resistor R25.

The terminal 117a, which is connected to the terminal 117 of the control switch 113 by way of the interconnect line 121c as mentioned earlier, is also connected to the collector of the transistor T3 and the base of the transistor T3 by way of a capacitor C4 and a resistor R8. The collector and the base of the transistor T3 are mutually connected by way of a resistor R9. The terminal 117a is connected, by way of a capacitor C4 and a diode D10, to the node between the diode D4 and the resistor R26 and is therefore grounded by way of the capacitor C4, the diode D10 and the resistor R26.

The emitter of the transistor T3 is grounded by way of a resistor R10 and is connected to the base of the transistor T4 with a grounded emitter by way of a resistor R11. The base of the transistor T4 is grounded by way of a resistor R12. The collector of the transistor T3 is connected to the collector of the transistor T4 by way of a resistor R13.

The collector of the transistor T4 is connected to the base of the transistor T5 and with a grounded emitter by way of a resistor R14 and a diode D11. The base of the transistor T5 is grounded by way of a resistor R15 and the collector of the transistor T5 is connected to the base of the transistor T7 by way of a resistor R16.

The terminal 120a, which is connected to the terminal 120 of the control switch 113 and the washer pump motor 124 by way of an interconnect line 121d, is connected to the base of the transistor T5 by way of a diode D14, resistors R20, R21 and R23 and a diode D12. The node between the resistors R20 and R21 is grounded by way of a zener diode Zd and the node between the resistors R21 and R23 is grounded by way of a capacitor C5 and a resistor R22.

The terminal 115a, which is connected to the terminal 115 of the control switch 113 is connected to the base of the transistor T5 by way of a resistor R27 and a diode D15.

Now the action of the present embodiment is described in the following with reference to the above mentioned circuit diagram.

When the stop (OFF) position is selected by the control switch 113 and the position detection switch 125 associated with the windshield wiper motor 122 is closed with the windshield wiper blades 3 positioned at their park positions, the terminal 125a, receives a voltage from the power line 123. Therefore, the cathodes of the diodes D3, D4 and D5 are at a high voltage level and the transistors T7, T3 and T1 are turned off. As a result, the transistor T8 which is controlled by the on-off state of the transistor T7 is turned off and the windshield wiper motor 122 which is controlled by the state of the transistor T8 stops.

When the intermittent (INT) position is selected by the control switch 113, since the terminals 117 and 118 of the control switch 113 are short circuited and the interconnect line 121c is electrically connected to the power line 123, a certain voltage is supplied to the terminal 117a.

Since the transistor T3 is in the OFF state and the transistor T3 is therefore in the OFF state, the voltage from the terminal 117a is applied to the base of the transistor T5 and turns it on. When the transistor T5 turns on, a voltage is applied to the base of the transistor T7 and turns it on. As a result, a voltage is applied to the base of the transistor T8 and turns it on. Then, the interconnect line 121a connected to the windshield wiper motor 122 is grounded by way of the control switch 113, the interconnect line 121b, the terminal 116a and the transistor T8, and the windshield wiper motor 122 starts turning by receiving a supply of electric current.

As the windshield wiper motor 122 turns, the position detection switch 125 opens as indicated by the imaginary line and the cathode of the diode D4 is pulled down to a low voltage. As a result, electric current starts flowing through the diode D10 and the resistor R26 and electrically charges the capacitor C4. Since the transistors T3 and T4 are thus turned on, the transistor T5 turns off but, since the cathode of the diode D3 is at a low voltage level and the base current of the transistor T7 flows through the diode D13 and the resistor R25, the transistors T7 and T8 maintains their ON state and the windshield wiper motor 122 continues to rotate.

When the position detection switch 125 is open, since the cathode of the diode D5 is at a low voltage level in the same way as the diodes D3 and D4, electric current flows through the diode D2 and the transistor T1 is turned on with the result that the capacitor C2 starts to be electrically charged and the transistor T2 turns on. Since the transistor T7 is in the ON state as mentioned earlier and the cathode of the diode D3 is at a high voltage level, no electric current flows through the diode D13 and the transistor T7 is turned off. When the transistor T7 is turned off, since the transistor T8 is also turned off and the cathode of the diode D5 is pushed up to a high voltage level as mentioned earlier, the transistor T1 is turned off. Then, since the capacitor C2 begins an electric discharge, the transistor T2 maintains its ON state and, since the transistor T7 is in the OFF state and the cathode of the diode D9 is pulled down to a low voltage level, the transistor T6 turns on by receiving a voltage at its base.

When the transistor T6 turns on, since the terminals 125a and 116a are mutually connected by way of the transistor T6, the circuit of the windshield wiper motor 122 is closed by the position detection switch 125, the interconnect line 121e, the terminal 125a, the transistor T6, the terminal 116a and the interconnect line 121a, thereby generating a counter current in the windshield wiper motor 122 so as to apply a electrodynamic braking force to the motor 122.

When the position detection switch 125 is closed and the cathode of the diode D4 is pushed up to a high voltage level again thereby stopping the flow of electric current through the diode D10, the capacitor C4 starts electrically discharging and the transistor T3 turns on receiving a base current. During the time the capacitor C4 is electrically discharging, the transistor T3 remains in the ON state. This in turn causes the transistor T4 to be turned on and, then, the transistor T5 is turned off causing the transistors T7 and T8 to be turned off. Therefore, during the time the capacitor C4 is electrically discharging, the windshield wiper motor 122 continues to rotate.

When the capacitor C4 has completed electric discharge, since the base current of the transistor T3 is stopped and the transistors T3 and T4 are turned off, the transistors T5, T7 and T8 are turned on and the windshield wiper motor 122 resumes its rotation.

When the continuous mode (LO) is selected by the control switch 113, the terminals 115 and 118 are connected to each other and the power line 123 is electrical connected to the interconnect line 121b which is connected to the terminal 115a of the circuit board 11. The terminal 115a is connected to the base of the transistor T5 by way of the resistor R27 and the diode D15 and the transistor T5 is therefore turned on, causing the transistors T7 and T8 to be turned at the same time. As a result, the windshield wiper motor 22 rotates without regards to the state of the position detection switch 25.

When the washer mode 119 is selected by the control switch 113 irrespective of its position, the stop (OFF) position, the intermittent (INT) position or the continuous (LO) position, the terminals 118 and 120 of the control switch 113 are mutually short circuited and the power line 123 is electrically connected to the interconnect line 121d with the result that a voltage is applied to the washer pump motor 124 and washer fluid is sprayed to the windshield.

At the same time, a voltage is also applied to the terminal 120a and the capacitor C5 begins to be electrically charged by receiving the electric current. After a certain time interval has elapsed, a voltage is applied to the base of the transistor T5 by way of the diode D12, turning on the transistors T5, T7 and T8, and the motor 122 starts turning.

When the waser mode 119 is stopped, the voltage at the terminal 120a disappears at the same time as the washer pump motor 124 stops and, since the capacitor C5 starts electrically discharging keeping the transistors T5, T7 and T8 in the On state, the windshield wiper motor 122 continues to rotate. When the discharge of the capacitor C5 is completed, the transistor T5 turns off. But, since the transistor T7 continues to be in the ON state as long as the position detection switch 125 is open in the same way as in the intermittent mode, the windshield wiper motor 122 continues to rotate. When the windshield wiper motor 122 has turned for one full cycle of the wiper blade and the position detection switch 125 is closed, the windshield wiper motor 122 stops receiving the electrodynamic braking force in the same way as in the intermittent mode.

Although the above described embodiment involved the intermittent action, the washer-related action and the continuous low speed action of the wiper blade, the windshield wiper motor control system of this embodiment may be additionally provided with circuits for other actions such as continuous high speed action.

Thus, by integrally attaching the circuit board having a control circuit which may be in the form of a hybrid IC to the metallic casing of the windshied wiper motor system, not only the length of the wires extending between the motor and the control device is reduced but also the number of wires extending between the control device and the control switch is reduced with the result that the vehicle weight is reduced and the assembly work is simplified. Furthermore, since there is no need for mounting a separate control device to the vehicle, the assembly work for the control device can be omitted and the circuit board can be incorporated into the casing of the motor system without any substantial modification of the casing for the motor system.

Although the present invention has been shown and described with reference to the preferred embodiment thereof, it should not be considered as limited thereby. Various possible modifications and alterations could be conceived of by one skilled in the art to any particular embodiment, without departing from the scope of the invention. For instance, the control circuit may be attached to the part of the casing by way of a favorable heat conducting material and the circuit board 11 or 41 may be fixedly attached to the cover 9 or 39, for example, by way of a sheet of rubber material such as TF Rubber (trade name of Mitsubishi Denki KK of Tokyo, Japan) which may be adhesive and has a relatively high thermal conductivity. And, the application of the present invention is not limited to windshield wiper systems and power window systems but can be applied to all motor-driven automotive accessories.

What we claimed is:

1. An electric motor system for automobiles having an electric motor and a control circuit for the motor, wherein the control circuit is attached to a detachable cover of the motor in a mutually heat conducting relationship, said motor system further comprises a speed reduction unit and said detachable cover is detachably attached to a housing for the speed reduction unit wherein said control circuit comprises a circuit board mounted with printed circuit elements and chip circuit elements including a semi-conductor device, said control circuit is encapsulated in resin material, wherein the control circuit comprises a switch which is activated by a moving part of the speed reduction unit.

2. An electric motor system as defined in claim 1, wherein the motor system is a windshield wiper system.

3. An electric motor system for automobiles having an electric motor and a control circuit for the motor, wherein the control circuit is attached to a detachable cover of the motor in a mutually heat conducting relationship, said motor system further comprising a speed reduction unit and said detachable cover is detachably attached to a housing for the speed reduction unit wherein said control circuit comprises a circuit board mounted with printed circuit elements and chip circuit elements including a semi-conductor device, said control circuit is encapsulated in resin material, wherein the control circuit is connected to a detector for detecting a motion of the motor.

4. An electric motor system as defined in claim 3, wherein the motor system is a power window system.

5. An electric motor system for automobiles having an electric motor with a housing and a control circuit for the motor, said control circuit is attached to the motor housing in a mutually heat conducting relationship, said electric motor system further comprises a speed reduction unit and a portion of the housing to which the control circuit is attached is a detachable cover for the speed reduction unit, wherein said control circuit is encapsulated in resin material and comprises a circuit board mounted with printed circuit elements and chip circuit elements including a semicondcutor device, wherein said control circuit further comprises a switch which is activated by said motor.

6. An electric motor system as defined in claim 5, wherein the motor system is a windshield wiper system.

7. An electric motor system for automobiles having an electric motor with a housing and a cotnrol circuit for the motor, said control circuit is attached to the motor housing in a mutually heat conducting relationship, said electric motor system further comprises a speed reduction unit and a portion of the housing to which the control circuit is attached is a detachable cover for the speed reduction unit, wherein said control circuit is encapsulated in resin material and comprises a circuit board mounted with printed circuit elements and chip circuit elements including a semiconductor device, wherein said control circuit further includes a detector for detecting motion of the motor.

8. An electric motor system as defined in claim 7, wherein the motor system is a power window system.

* * * * *